July 21, 1964    J. J. EVANS ETAL    3,141,628
MEASURING APPARATUS
Filed June 14, 1962    3 Sheets-Sheet 1
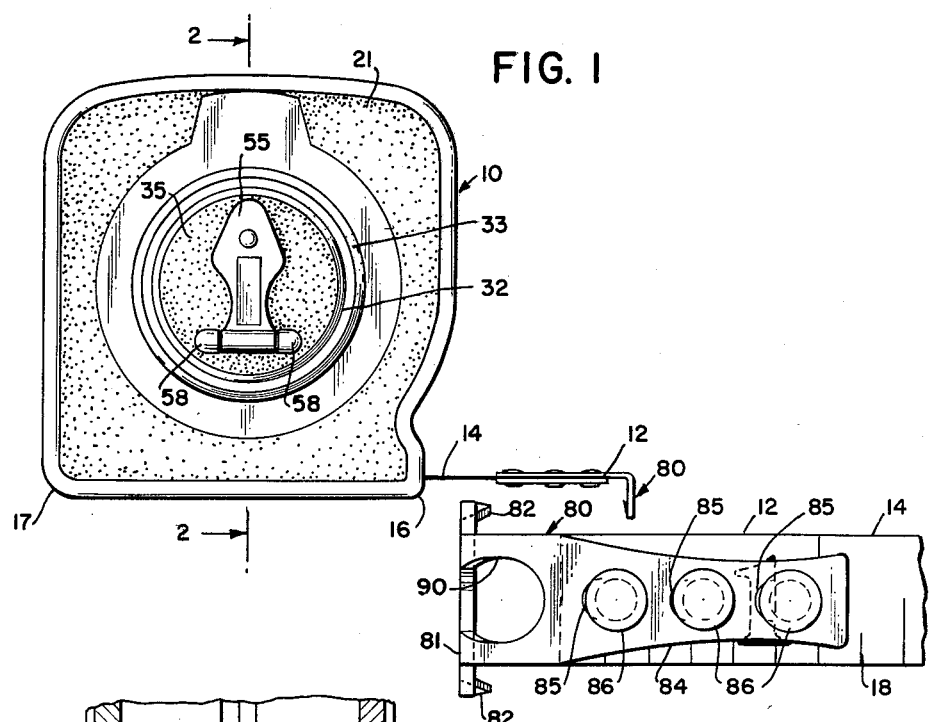
FIG. 1
FIG. 6
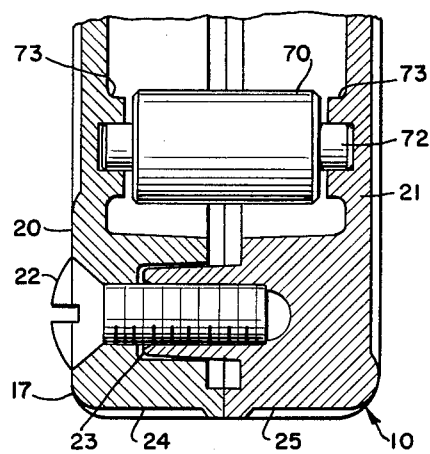
FIG. 5
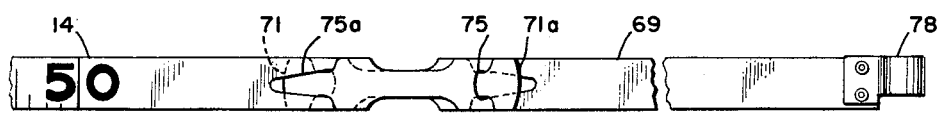
FIG. 7

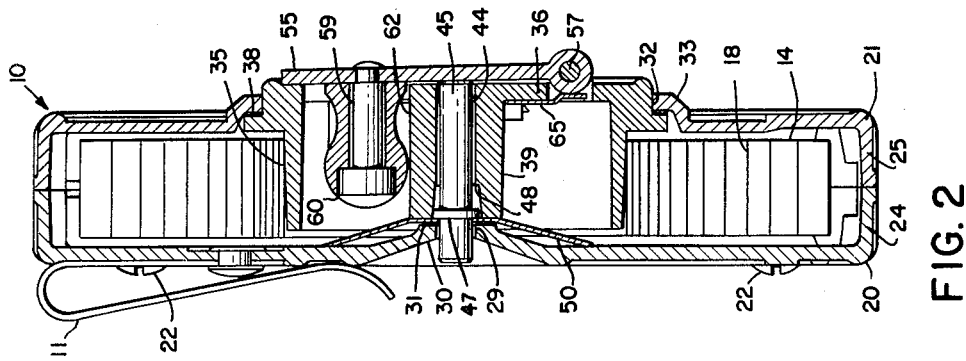
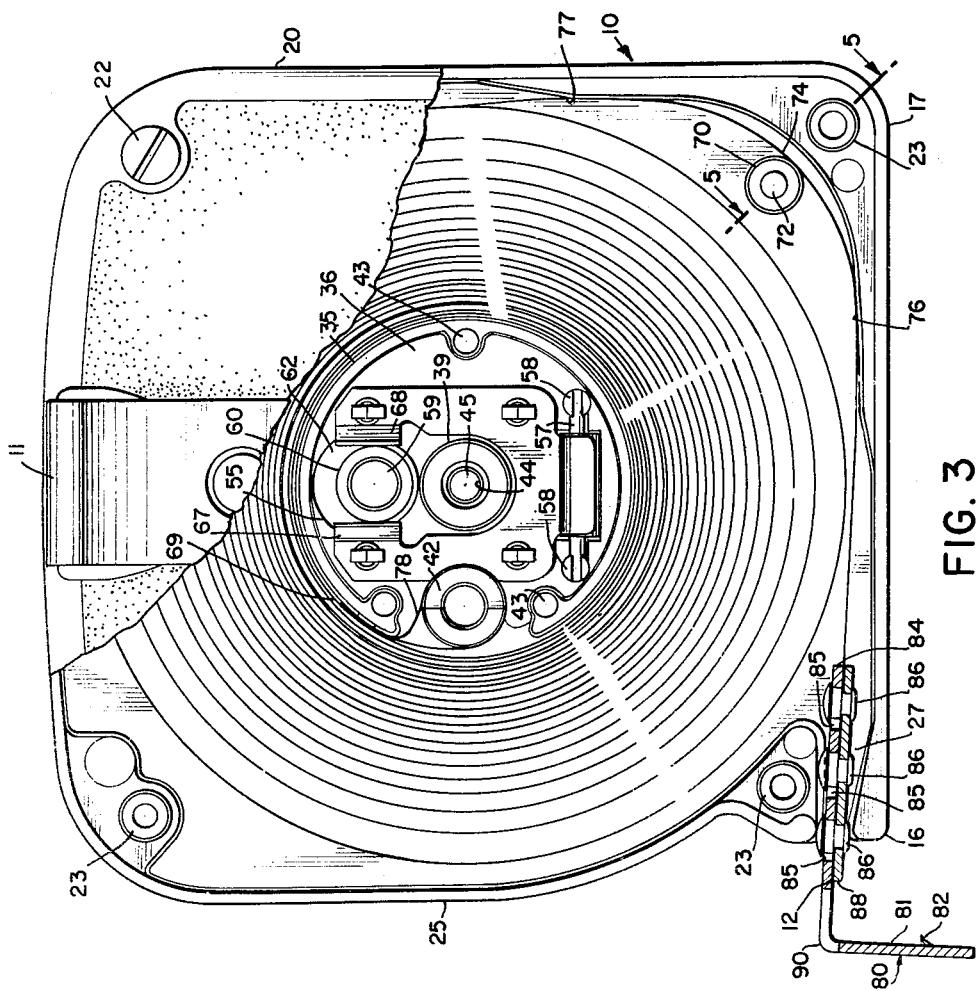

July 21, 1964

J. J. EVANS ETAL 3,141,628

MEASURING APPARATUS

Filed June 14, 1962

3,141,628
MEASURING APPARATUS
John Joseph Evans, Scotch Plains, and John Joseph
Evans, Jr., Westfield, N.J., assignors to The Evans Rule
Co., Elizabeth, N.J., a corporation of New Jersey
Filed June 14, 1962, Ser. No. 202,423
11 Claims. (Cl. 242—84.8)

This invention relates to measuring apparatus and more particularly to such apparatus in which an elongated tape having measuring indicia thereon is removably mounted within a tape casing.

There has been developed a tape ruler of the so-called "push-pull" type which is extremely compact and highly accurate in use. One such ruler is disclosed, for example, in John J. Evans Patent 2,636,694, issued April 28, 1953. Rulers of this type customarily include a centrally located post which is supported within a surrounding casing. One end of the tape is fastened to the post, as by a suitable spring member, and the opposite end extends through an opening in the casing. The tape is arranged to be withdrawn from the casing for measurement purposes and thereafter returned to its position within the casing.

Particularly in cases where relatively long measurements are to be made, a rotatable reel or drum is substituted for the post, and the tape is wound around the reel with its inner end connected thereto. In addition, means customarily are provided for rotating the reel to wind up the tape after use.

Heretofore, primarily because of the spring tension in that portion of the tape which is wound around the reel, the extended part of the tape frequently exhibited a tendency to move, or "creep" with respect to the casing, thus impairing the accuracy of the particular measurement being made. In addition, and this has been of special moment in cases in which the tape is withdrawn or returned to the casing at a relatively rapid rate, the inertia of the reel often resulted in relative movement between the reel and the tape. As a result, the tape often jammed within the casing.

Although numerous prior attempts have been made to remedy these defects, such attempts for the most part involved the use of somewhat elaborate devices for clamping the tape within the casing. In many cases, these clamping devices restricted the movement of the tape and its supporting reel to such an extent that it became difficult to withdraw the tape from the casing and to thereafter rewind it after use. Also, in measuring devices of the type employed heretofore, the outer end of the tape, which customarily is provided with a transversely extending hook portion, often broke off after repeated usage, with the result that the tape required frequent repair or replacement.

One general object of this invention, therefore, is to provide a new and improved measuring apparatus of the type which includes an elongated tape supported within a tape casing.

More specifically, it is an object of this invention to provide such apparatus in which the deleterious effects of creepage are substantially eliminated.

Another object of this invention is to provide apparatus of the character indicated in which both the tape and its supporting reel are readily movable to withdraw or rewind the tape but are maintained in substantially fixed relationship with the casing immediately upon the termination of such movement.

Still another object of the invention is to provide such apparatus in which the incidence of breakage of the tape is greatly reduced.

A further object of the invention is to provide a new and improved measuring apparatus, utilizing comparatively simple components, which is economical to manufacture and assemble and thoroughly reliable in operation.

In one illustrative embodiment of this invention, there is provided a measuring apparatus which includes a casing having a pair of opposed side walls. The casing includes a tape receiving opening therein and at least one substantially right-angle corner spaced from the opening. A cylindrical reel is rotatably carried within the casing, and this reel is provided with an integrally formed pin thereon. One end of the tape is secured to the pin, while the other end protrudes from the tape receiving opening so that the tape may be withdrawn from the casing. The tape is returned to the casing by a crank member which is releasably mounted on the reel.

In accordance with one feature of the invention, in certain particularly advantageous embodiments, a spring member of unique configuration and arrangement is interposed between the reel and one of the casing side walls, and this spring member serves to maintain the reel in spaced relationship therewith. A bearing element is positioned between the reel and the other side wall of the casing to facilitate relative movement therebetween. The arrangement is such that the reel is readily movable to withdraw or reel in the tape but is maintained in substantially stationary relationship with the casing in the absence of such movement.

In accordance with another feature of the invention, in certain good arrangements, there is provided an upstanding roller within the casing adjacent the right-angle corner thereof, and the outer convolution of the coil of tape around the reel passes between this roller and the adjacent portion of the casing. The roller urges the tape into frictional engagement with the casing at particular, discrete points, with the result that the adverse effects of creepage are substantially eliminated.

In accordance with a further feature of the invention, in some embodiments, the axis of the integrally formed pin is spaced from the axis of rotation of the reel in a manner such that any substantial bending of the inner portion of the tape is greatly reduced.

The present invention, as well as further objects and features thereof, will be understood more clearly and fully from the following detailed description of a preferred embodiment thereof, when read in conjunction with the accompanying drawings, in which:

FIGURE 1 is an elevational view of one side of a measuring apparatus constructed in accordance with the invention;

FIGURE 2 is an enlarged sectional view taken along the line 2—2 in FIGURE 1;

FIGURE 3 is an elevational view of the opposite side of the apparatus shown in FIGURE 1, with certain parts broken away and others shown in section;

FIGURE 5 is an enlarged fragmentary sectional view taken along the line 5—5 in FIGURE 3;

FIGURE 6 is a plan view of the external end portion of a measuring tape useful in connection with the apparatus; and FIGURE 7 is a plan view of the internal end portion of the tape.

Figure 4:
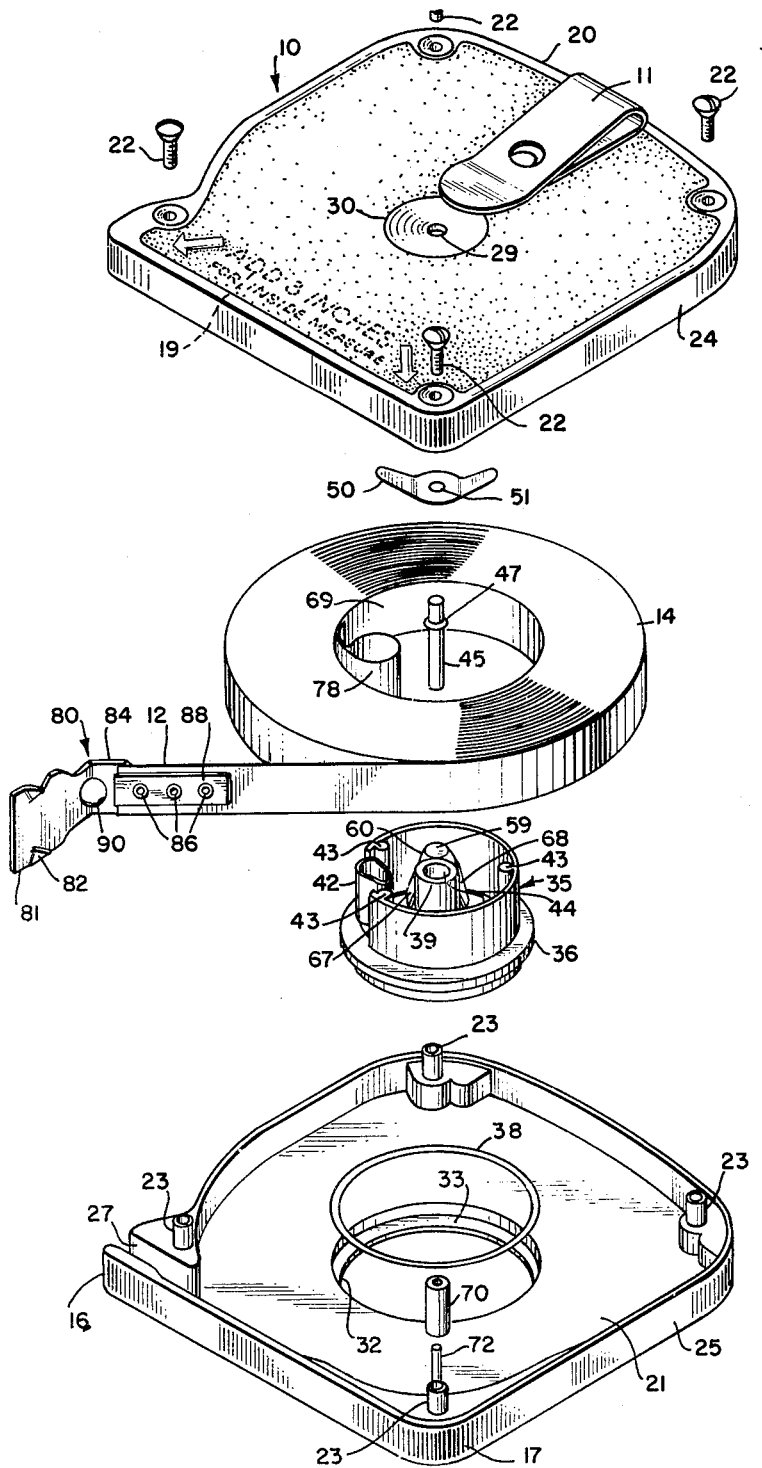
FIGURE 4 is an exploded perspective view of the apparatus.

Referring to the drawings, there is shown a tape measure having a substantially square casing 10 which is provided with a belt clip 11 (FIGURE 4) thereon. The outer portion 12 of an elongated flat tape 14 protrudes from the casing 10 adjacent a right-angle corner 16 thereon. This tape portion extends in a direction parallel to the side of the casing between the corner 16 and a second right-angle corner 17. The tape 14 includes the usual measuring scale 18 (FIGURE 6) and illustratively has a length of from about fifty to one hundred feet. The length of the side of the casing between the corners 16 and 17 depends in part on the length of the tape and in the illustrated embodiment is three inches, corresponding to a fifty foot tape. If desired, the casing may be provided with a suitable legend 19 (FIGURE 4) denoting the length of the casing side and indicating that this length should be added to the distance shown by the scale 18 when making an inside measurement.

As best shown in FIGURES 2 and 4, the casing 10 is formed from two casing halves 20 and 21 which are maintained in opposed, abutting relationship with each other by set screws 22. These csrews extend through the casing half 20 and are disposed in mating dowels 23 on the casing half 21. The halves 20 and 21 are substantially flat but include upstanding flanges 24 and 25, respectively, which are integrally formed therewith. Each of the flanges 24 and 25 extends around the periphery of the corresponding casing half and is provided with a gap adjacent the right-angle corner 16 to form a tape receiving opening 27 in the casing which is spaced from the right-angle corner 17. The half 20 includes a relatively small, centrally located aperture 29 of circular configuration which is surrounded by a depression 30 in the outer casing surface, the depression forming an interior boss 31 around the aperture. A considerably larger circular aperture 32 is disposed in the half 21 in axial alignment with the aperture 29, and surrounding the aperture 32 is a raised annular ledge 33.

Interposed between the casing halves 20 and 21 is a rotatably supported reel 35. The reel 35 is substantially in the shape of a hollow cylinder and is coaxially mounted with respect to the apertures 29 and 32. A circular plate 36 serves to close one end of the reel 35, and this plate is of a diameter slightly larger than the diameter of the aperture 32. The plate 36 is disposed adjacent the annular ledge 33 but is separated therefrom by a bearing washer 38, which advantageously is fabricated from paraffin impregnated fiber or other suitable fibrous material. The reel 35 extends inwardly from the plate 36 and includes an axial boss 39 and an elongated pin member 42 adjacent the reel periphery. This pin member is integral with the reel 35 and is disposed along an axis which is parallel to but spaced from the axis of rotation of the reel, for purposes that will become more fully apparent hereafter. The cylindrical portion of the reel is provided with integrally formed reinforcing members 43 for structural rigidity.

The reel 35 includes an axial aperture 44 which extends through the plate 36 and the boss 39. The aperture 44 accommodates a reciprocally movable pin 45 having a shoulder 47 intermediate its ends. An elongated, transversely extending leaf spring 50 is loosely positioned on the pin 45 on the side of the shoulder 47 adjacent the casing half 20. The spring 50 is provided with a centrally located aperture 51 through which the pin extends. The center portion of the spring 50 bears against the boss 39, and the spring is suitably bowed so that its ends engage the inner surface of the half 20. The tension in the spring maintains the boss 39 in spaced relationship with the inner boss 31 on the half 20 and urges the reel toward the half 21 to hold the plate 36 in engagement with the fiber washer 38.

In the position shown in FIGURE 2, the end of the pin 45 adjacent the leaf spring 50 protrudes through the aperture 29 in the casing half 20, while the opposite end of the pin engages an elongated crank arm 55 intermediate its ends. In this position, the crank arm 55 is flush with the outer surface of the reel plate 36. One end of the arm 55 is supported by a pivot shaft 57 which is suitably journaled in the plate 36, as at 58 (FIGURE 3). The opposite arm end is provided with a transversely extending pin 59 having a handle 60 rotatably mounted thereon. This handle is removably disposed in an opening 62 in the plate 36 between the axial aperture 44 and the plate periphery.

A substantially flat spring member 65 is affixed to the inner surface of the reel plate 36 and is provided with two upstanding portions 67 and 68 adjacent the opening 62. The portions 67 and 68 are arranged to releasably grip the handle 60 and thereby hold the arm 55 in its closed (FIGURE 2) position. To release the handle 60, the end of the pin 45 adjacent the casing half 20 is depressed until the shoulder 47 moves into engagement with a mating, inner shoulder 48 on the boss 39. During this movement, the opposite end of the pin pivots the arm 55 about the shaft 57, and the spring portions 67 and 68 spread slightly to permit withdrawal of the handle from the opening 62. As will be understood, the arm 55 is pivotally movable about the shaft 57 through an arc of approximately one hundred and eighty degrees to enable the manual rotation of the reel 35 to reel in the tape 14.

As best shown in FIGURE 7, the tape 14 includes an inner end portion 69 which is cut to form a tab 71 at one end thereof and a recess 75 in spaced relationship with the tab. The remaining portion of the tape is provided with a mating tab 71a and a recess 75a. The tab 71 is inserted in the recess 75a, while the tab 71a is inserted in the recess 75, thereby maintaining the tape portion 69 in fixed, substantially coplanar relationship with the remaining tape portion.

A loop 78 is riveted or otherwise rigidly affixed to the opposite end of the tape portion 69. As viewed in FIGURE 3, this loop extends around the pin 42 in a clockwise direction, and the tape surrounds the reel 35 in a similar direction to form a tightly wound coil. As indicated heretofore, the axis of the pin 42 is spaced from the axis of rotation of the reel and is in close proximity with the reel periphery. With this arrangement, any repeated bending of the end portion 69 is maintained at a minimum during the rotation of the reel by the crank arm 55, either in a counterclockwise direction to wind up the tape or, through inadvertence, in a reverse or clockwise direction. As a result, the incidence of breakage of the tape adjacent the portion 69 is considerably reduced.

The outer convolution of the coil of tape around the reel 35 is interposed between the casing flanges 24 and 25 and an upstanding roller 70. As best shown in FIGURE 5, the roller 70 is mounted on a pin 72 which extends in a direction transverse to the longitudinal direction of the tape and is positioned adjacent the casing corner 17 in suitable locating bosses 73 in the flanges 24 and 25. The roller 70 urges the tape toward the casing flanges and forms a comparatively sharp bend 74 (FIGURE 3) therein, and the outer tape surface frictionally engages the flanges at two discrete points 76 and 77 on either side of the roller. This frictional engagement holds the tape with sufficient force to prevent any substantial creepage thereof with respect to the casing 10 but does not unduly restrict the withdrawal of the tape or its return to the casing in response to the rotation of the reel 35.

From the roller 70, the tape 14 extends through the opening 27 in the casing 10, and its outer end portion 12 is provided with an L-shaped plate 80. One leg 81 of the plate 80 extends in a direction perpendicular to the longitudinal direction of the tape and is provided with the usual prongs 82 which are arranged to bite into a wooden beam (not shown) or other structural element being measured to firmly hold the outer end of the tape in position. As best shown in FIGURE 6, the other leg 84 of the plate 80 includes three elongated apertures 85 which respectively accommodate rivets 86. Each of these rivets extends through its corresponding aperture and the end portion 12 of the tape, and the rivets are affixed to a stationary reinforcing plate 88 on the side of the tape opposite that adjacent the leg 84. The leg 84 and the plate 88 are relatively rigid, and the tape portion 12 is sandwiched therebetween, thus preventing any breaking of the portion 12 even after repeated usage.

The elongated apertures 85 permit the movement of the plate 80 in a longitudinal direction with respect to the tape portion 12 and the plate 88 for a distance equal to the thickness of the plate leg 81. As a result, during a measurement the extreme outer end of the tape is at all times flush with the surface of the structural element in engagement with the leg 81. In cases in which the element being measured does not include a suitable surface, the plate 80 may be hooked over a nail, screw, etc. by means of a centrally located aperture 90, to hold the end of the tape in position.

Upon the completion of a particular measurement, the elongated pin 45 is depressed to release the handle 60 and the crank arm 55. The arm 55 is pivoted about the shaft 57 through about a one hundred and eighty degree arc and is then rotated by means of the handle to similarly rotate the reel 35. The relative movement between the reel and the casing half 21 is facilitated by the fiber washer 38, with the result that the tape is quickly and easily returned to its position within the casing. The handle 60 is thereupon released, and any tendency of the reel to continue its rotation is prevented by the resistance of the leaf spring 50 to relative movement between the reel and the casing half 20.

As best shown in FIGURE 4, the apparatus is quickly and easily assembled in a rapid and straightforward manner. To accomplish such assembly, the casing section or half 21 is positioned on a suitable assembly table (not shown), and the roller pin 72 is inserted in the locating boss 73. The roller 70 is placed on the pin 72, and the washer 38 is positioned on the inner surface of the annular ledge 33.

The reel 35 is then located on the assembly with the plate 36 in engagement with the washer 38. With the reel in place, the tape end portion 69 is positioned thereadjacent with the loop 78 disposed around the reel pin 42. The remaining part of the portion 69 is oriented between the roller 70 and the casing flanges 24 and 25 and protrudes through the opening 27. The elongated pin member 45 is inserted in the axial aperture 44 of the centrally located boss 39 with the shoulder 47 adjacent the upper portion of the boss.

After the pin 45 has been placed in position, the bowed leaf spring 50 is disposed thereon with its end portions extending in directions away from the axial boss 39. The casing section 20 is then placed on the casing section 21 and is accurately positioned thereon by means of the four locating dowels 23. The halves 20 and 21 are held in fixed relationship with each other by the set screws 22. Thereafter, the main portion of the tape 14 is attached to the tape portion 69 by means of the tabs 71 and 71a and the recesses 75 and 75a (FIGURE 7), and the reel 35 is rotated to wind the tape into position within the casing. In this position, the tape forms a tightly wound coil with its outer convolution oriented between the roller 70 and the flanges 24 and 25.

The external diameter of the reel 35 is greater than the diameter of either of the casing apertures 29 and 32, and the reel is located substantially entirely within the casing. During assembly, the loop 78 at the inner end of the tape is positioned on the reel pin 42 prior to the time the casing sections 20 and 21 are secured together, thus obviating the time consuming and sometimes difficult task of inserting the tape through the opening 27 and around the pin after the closing of the casing.

After the casing has been assembled, the main portion of the tape is quickly and easily affixed to the end portion 69, as described above. Alternatively, the tape and its end portion may be integrally formed, and the entire coil of tape may be located in position around the reel before the casing sections are secured together.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. In measuring apparatus, in combination, a casing including a tape receiving opening therein and at least one substantially right-angle corner spaced from said opening, said casing having a pair of opposed side walls and a centrally located aperture in one of said walls, a cylindrical reel member rotatably carried within said casing, an elongated tape wound around said reel member and having one end thereof secured to said member, the other end of said tape extending through said opening, crank means mounted on said reel member adjacent the aperture in said one side wall for rotating said reel member to reel an external portion of said tape into said casing, means interposed between said reel member and the other side wall of said casing for maintaining the same in spaced relationship with said reel member and for resisting rotary movement of said member with respect to said casing, and roller means positioned within said casing and rotatable about a fixed axis adjacent the right-angle corner thereof for urging the outer convolution of the tape wound around said reel member into frictional engagement with said casing, to resist relative movement therebetween.

2. In measuring apparatus, in combination, a casing including a tape receiving opening therein, said casing having a pair of opposed side walls and a centrally located aperture in one of said walls, a cylindrical reel member rotatably carried within said casing and including an elongated pin disposed along an axis parallel to but spaced from the axis of rotation of said member, an elongated tape wound around said reel member and having a looped portion at one end thereof positioned on said pin, the other end of said tape extending through said opening, crank means mounted on said reel member adjacent the aperture in said one side wall for rotating said reel member to reel an external portion of said tape into said casing, means interposed between said reel member and the other side wall of said casing for maintaining the same in spaced relationship with said reel member, and a roller positioned within said casing in contact with said tape for urging the outer convolution of the tape wound around said reel member into frictional engagement with said casing at particular, discrete points, to resist relative movement therebetween.

3. In measuring apparatus, in combination, a casing including a tape receiving opening therein, said casing having a pair of opposed side walls and a centrally located aperture in one of said walls, a cylindrical reel member rotatably carried within said casing and including an elongated pin disposed along an axis parallel to but spaced from the axis of rotation of said member in close proximity with the periphery thereof, an elongated tape wound around said reel member and having a looped portion at one end thereof positioned on said pin, the other end of said tape extending through said opening, crank means mounted on said reel member adjacent the aperture in said one side wall for rotating said reel member to reel an external portion of said tape into said casing, and means including a bowed leaf spring interposed between said reel member and the other side wall of said casing for maintaining the same in spaced relationship with said reel member, said leaf spring engaging said other side wall at a plurality of points to resist rotary movement of said reel member with respect to said casing.

4. In measuring apparatus, in combination, a casing including a tape receiving opening therein, said casing having a pair of opposed side walls and a centrally located aperture in one of said walls, a cylindrical reel member rotatably carried within said casing and including an elongated pin disposed along an axis spaced from the axis of rotation of said member, an elongated tape wound around said reel member and having a looped portion at one end thereof positioned on said pin, the other end of said tape extending through said opening, crank means mounted on said reel member adjacent the aperture in said one side wall for rotating said reel member to reel an external portion of said tape into said casing, a bearing element positioned between said reel member and said one side wall, and means including a bowed leaf spring interposed between said reel member and the other side wall of said casing for maintaining the same in spaced relationship with said reel member and for urging said member and said bearing element toward said one side wall.

5. In measuring apparatus, in combination, a casing including a tape receiving opening therein and at least one substantially right-angle corner spaced from said opening, said casing having a pair of opposed side walls and a centrally located aperture in one of said walls, a cylindrical reel member rotatably carried within said casing and including an elongated pin disposed along an axis spaced from the axis of rotation of said member, an elongated flat tape wound around said reel member and having a looped portion at one end thereof positioned on said pin, the other end of said tape extending through said opening, crank means mounted on said reel member adjacent the aperture in said one side wall for rotating said reel member to reel an external portion of said tape into said casing, a bearing element positioned between said reel member and said one side wall, means interposed between said reel member and the other side wall of said casing for maintaining the same in spaced relationship with said reel member and for resisting rotary movement of said member with respect to said tape, and means including a roller element positioned within said casing adjacent the right-angle corner thereof, the outer convolution of the tape wound around said reel member passing between said roller element and said corner, said roller element urging the outer convolution into frictional engagement with said casing to resist relative movement therebetween.

6. In a tape measure, in combination, a casing having a pair of opposed side walls, said casing including a tape receiving opening therein and at least one substantially right-angle corner spaced from said opening, a cylindrical reel member rotatably positioned within said casing and including an integrally formed pin disposed along an axis parallel to but spaced from the axis of rotation of said member in close proximity with the periphery thereof, a bearing element of fibrous material interposed between said reel member and one of the side walls of said casing to facilitate relative movement therebetween, spring means positioned between said reel member and the other side wall of said casing for maintaining said reel member in spaced relationship therewith, an elongated tape surrounding said reel member and including a looped portion at one end thereof disposed around said pin, the other end of said tape extending through said opening, roller means positioned within said casing adjacent the right-angle corner thereof, the outer convolution of the tape surrounding said reel member passing between said roller means and said corner, and means for rotating said reel member to reel an external portion of said tape into said casing.

7. In a tape measure, in combination, a casing including a tape receiving opening and a pair of opposed casing sections having mating flange portions, each of said sections defining a centrally located aperture therein, a cylindrical reel member rotatably positioned within said casing intermediate said apertures and including an elongated pin disposed along an axis spaced from the axis of rotation of said member, an annular washer of fibrous material interposed between said reel member and one of said casing sections to facilitate relative movement therebetween, spring means positioned between said reel member and the other of said casing sections for maintaining said member in spaced relationship therewith and for urging said reel member and said washer toward said one casing section, a relatively long flat tape surrounding said reel member and including a looped portion at one end thereof disposed around said pin, the other end of said tape extending through said opening, means including a pair of plate elements mounted on opposite surfaces of said tape adjacent the other end thereof, one of said elements including a transversely extending end portion movably carried by said tape and the other of said elements being fixedly secured to said tape, and crank means mounted on said reel member adjacent one of said casing apertures for rotating said reel member to reel an external portion of said tape into said casing.

8. In a tape measure of the character set forth in claim 7, in which said tape comprises a first section including said looped portion and a second section including said other tape end, each of said tape sections having an aperture therein, a first tab on the end of said first section opposite that including said looped portion, and a second tab on the end of said second section opposite said other end, the apertures in said first and second sections respectively accommodating said second tab and said first tab, to enable the connection of said second section to said first section subsequent to the assembly of said casing.

9. In a tape measure, in combination, a casing including a tape receiving opening and a pair of opposed casing sections having mating flange portions, each of said sections defining a centrally located circular aperture therein, a cylindrical reel member having a portion rotatably positioned within said casing intermediate said apertures and including an integrally formed pin disposed along an axis parallel to but spaced from the axis of rotation of said member in close proximity with the periphery thereof, a portion of said member within said casing having an external diameter greater than the diameter of either of said apertures, an annular washer of fibrous material interposed between said reel member and one of said casing sections to facilitate relative movement therebetween, spring means positioned between said reel member and the other of said casing sections for maintaining said member in spaced relationship therewith, a relatively long flat tape surrounding said reel member and including a looped portion at one end thereof disposed around said pin, the other end of said tape extending through said opening, means including a pair of plate elements mounted on opposite surfaces of said tape adjacent the other end thereof, one of said elements including a transversely extending end portion movably carried by said tape and the other of said elements being fixedly secured to said tape, and means for rotating said reel member to reel an external portion of said tape into said casing, said last-mentioned means including a crank having an arm portion releasably mounted on said reel member adjacent one of said casing apertures and including means reciprocably supported within the other casing aperture for releasing said arm portion, to enable rotary movement of said crank to reel in an external portion of said tape.

10. A tape measure comprising, in combination, a casing including a tape receiving opening therein and at least one substantially right-angle corner spaced from said opening, said casing comprising a pair of opposed casing sections having mating flange portions, each of said sections defining a centrally located circular aperture therein, a cylindrical reel member having a portion rotatably positioned within said casing intermediate said apertures and including an elongated pin disposed along an axis spaced from the axis of rotation of said member, a portion of said member within said casing having an external diameter greater than the diameter of either of said apertures, bearing means interposed between said reel member and one of said casing sections to facilitate relative movement therebetween, spring means positioned between said reel member and the other of said casing sections for maintaining said member in spaced relationship therewith, an elongated tape surrounding said reel member and including a looped portion at one end thereof disposed around said pin, the other end of said tape extending through said opening, means including a pair of plate elements mounted on opposite surfaces of said tape adjacent the other end thereof, one of said elements including a transversely extending end portion movably carried by said tape and the other of said elements being fixedly secured to said tape, roller means positioned within said casing adjacent the right-angle corner thereof, the outer convolution of the tape surrounding said reel member passing between said roller means and said corner, said roller means urging a surface of said outer convolution into frictional engagement with said flange portions, and means for rotating said reel member to reel an external portion of said tape into said casing, said last-mentioned means including a crank portion releasably mounted on said reel member adjacent one of said casing apertures and means reciprocably supported within the other casing aperture for releasing said crank portion, to enable rotary movement thereof to reel in an external portion of said tape.

11. A tape measure comprising, in combination, a casing including a tape receiving opening therein and at least one substantially right-angle corner spaced from said opening, said casing comprising a pair of opposed casing sections having mating flange portions, each of said sections defining a centrally located circular aperture therein, a cylindrical reel member rotatably positioned within said casing intermediate said apertures and including an integrally formed pin disposed along an axis parallel to but spaced from the axis of rotation of said member in close proximity with the periphery thereof, a portion of said member within said casing having an external diameter greater than the diameter of either of said apertures, an annular washer of fibrous material interposed between said reel member and one of said casing sections to facilitate relative movement therebetween, means including an elongated leaf spring positioned between said reel member and the other of said casing sections for maintaining said member in spaced relationship therewith, each of the ends of said leaf spring engaging said other casing section and an intermediate portion of said spring engaging said reel member, a relatively long flat tape surrounding said reel member and including a looped portion at one end thereof disposed around said pin, the other end of said tape extending through said opening, means including a pair of plate elements mounted on opposite surfaces of said tape adjacent the other end thereof, one of said elements including a transversely extending end portion movably carried by said tape and the other of said elements being fixedly secured to said tape, roller means positioned within said casing and rotatable about a fixed axis adjacent the right-angle corner thereof, the outer convolution of the tape surrounding said reel member passing between said roller means and the flange portions of said casing sections, said roller means urging a surface of said outer convolution into frictional engagement with said flange portions at a plurality of particular, discrete points thereon, and means for rotating said reel member to reel an external portion of said tape into said casing, said last-mentioned means including a crank having an arm portion releasably mounted on said reel member adjacent one of said casing apertures and including means reciprocably supported within the other casing aperture for releasing said arm portion, to enable rotary movement of said crank to reel in an external portion of said tape.

References Cited in the file of this patent

UNITED STATES PATENTS

| | | |
|---|---|---|
| 1,592,030 | Langsner | July 13, 1926 |
| 1,638,226 | Witchger | Aug. 9, 1927 |
| 1,977,863 | Simpson | Oct. 23, 1934 |
| 2,614,769 | Nicholson | Oct. 21, 1952 |
| 2,680,576 | Nykwest et al. | June 8, 1954 |
| 2,893,656 | Carlson | July 7, 1959 |